Figure 1:
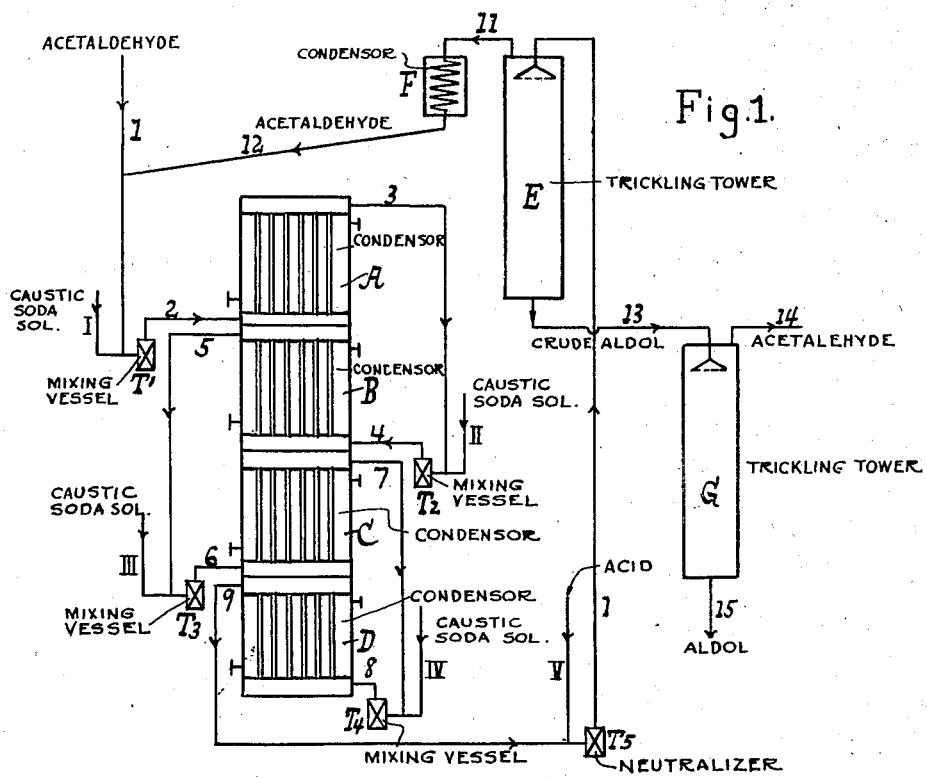

Oct. 11, 1932. M. MUELLER-CUNRADI ET AL 1,881,853
PROCESS FOR THE PRODUCTION OF ALDOL
Filed June 9, 1928

Inventors
Martin Mueller Conradi
Kurt Pierch
By their Attorneys

Patented Oct. 11, 1932

1,881,853

UNITED STATES PATENT OFFICE

MARTIN MUELLER-CUNRADI AND KURT PIEROH, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PROCESS FOR THE PRODUCTION OF ALDOL

Application filed June 9, 1928, Serial No. 284,270, and in Germany June 27, 1927.

The present invention relates to the production of aldol.

We have found that aldol is produced from acetaldehyde continuously and in a very advantageous manner by effecting the condensation of the said acetaldehyde by its passage in association with suitable condensing agents through reaction chambers which are provided with particularly efficient cooling means or devices.

For example, the acetaldehyde together with the condensing agent, such for example as dilute caustic soda solution, may be passed through tubes, for example spiral coils which are externally cooled. Or the tubes may be mounted in bundles immersed in a common cooling medium, or any other convenient or suitable arrangements enabling heat to be effectually removed may be used. It has also been found advisable to allow the temperature of the reaction mixture to rise during its passage through the apparatus. This can be effected, for example, by connecting a number of cooling devices in series, each of them being a a higher temperature than the previous one. It may also be of advantage to add the condensing agent in successive portions instead of all at one time.

In general, it is advisable that the condensation of the acetaldehyde to aldol should not be carried to completion, but that the process should be interrupted as soon as a considerable amount of the acetaldehyde has been converted. At the same time, a very pure aldol can be obtained if measures be taken to secure the continuous removal of the undecomposed aldehyde and any water and other products which may be present, for example by means of a blast of steam or other gases, if need be, after removing the condensing agent or rendering it inactive. A particularly advantageous method of working is first to expel the water and a portion of the acetaldehyde by moderate heating under diminished pressure, and then to extract the remainder of the acetaldehyde from the aldol by a further rise in temperature, also under diminished pressure. Care must be taken to keep the temperature below the decomposition temperature of the aldol. If necessary, gases or vapors may be passed through the reaction mixture, in order to obtain a more rapid removal of the water, undecomposed acetaldehyde and any other substances present.

By means of the process according to this invention the production of aldol can be carried on in a continuous manner with great technical advantage. Apart from the advantages resulting from continuous working, such as high output per unit of time and space, combined with low running costs, the process offers the considerable advantage over intermittent working in the fact that only small quantities of the inflammable acetaldehyde need be in the apparatus at any given time.

Figure 2:
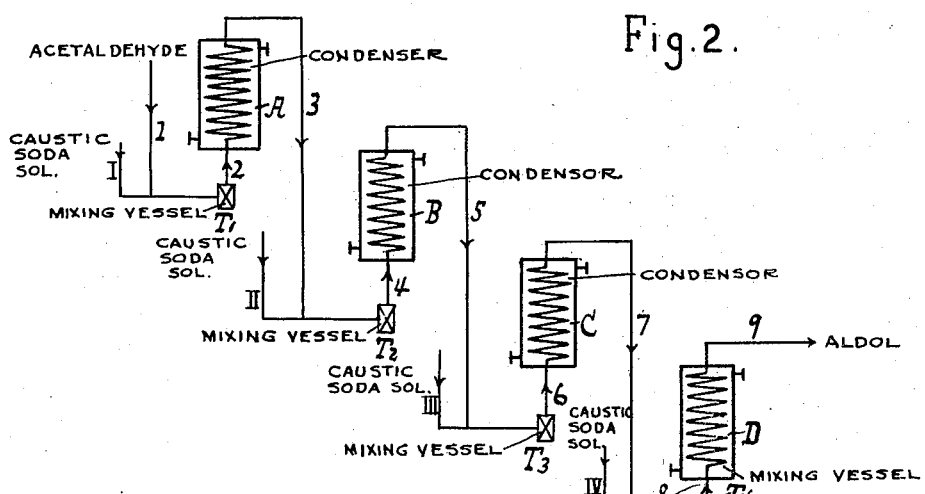

The process of the present invention may be performed in an apparatus, for example, as will be further explained in the following with reference to the annexed drawing in which Figure 1 shows an apparatus for the continuous preparation of aldol when employing a system of multiple straight pipe condensers and Figure 2 when employing a series of coil condensers. In order to be as brief as possible the arrangements will be explained while explaining the method of working therewith. The mixing vessel $T_1$ is fed with acetaldehyde from the pipe 1 and with caustic soda solution from the pipe I and the mixture runs after mixing through the pipe line 2 to the first condenser A. The product then runs through the pipe line 3, the mixing vessel $T_2$ and the pipe line 4 to the condenser B and subsequently through the pipe line 5, the mixing vessel $T_3$ and the pipe line 6 into the condenser C and from this through the pipe line 7, mixing vessel $T_4$ and pipe line 8 through the condenser D. The mixing vessels $T_2$, $T_3$ and $T_4$ can be fed with caustic soda solution through the pipe lines II, III and IV depending on the requirements. Through the pipe line 9 the reaction product leaves the condenser D and is neutralized in the mixing vessel $T_5$ by the addition of acid through pipe line V. After neutralization the reaction product is fed into the top of tower E which is provided with fillers and the product is freed, by heating, from the main quantity of acetaldehyde which latter after condensation in the condenser F, connected with the tower by the pipe line 11, is returned to the first condenser A by means of the pipe line 12. The aldol which leaves the tower E at the bottom and which is considerably freed from aldehyde is passed into a second tower G by means of the pipe line 13 in which tower the last traces of aldehyde are removed and drawn off through the pipe 14. If required, the tower G can be kept at a higher temperature than the tower E and the removal of the aldehyde from both the towers can be performed at a pressure below atmospheric pressure. The quantities of aldehyde recovered can be fed into the mixing vessel $T_1$ and the aldol which is freed from acetaldehyde is drawn off through the pipe 15. Working with the apparatus shown in Figure 2 is the same as explained above with reference to Figure 1.

The following example will further illustrate the nature of this invention, which however is not restricted thereto.

*Example*

Four spiral tubes arranged in series are immersed in cooling baths maintained at 3°, 8°, 15° and 20° C. respectively. Through these tubes is passed a mixture of 2 parts of acetaldehyde and 1 part of a 1.25 per cent solution of caustic soda, which may preferably be added in stages. After neutralizing the caustic soda in the reaction product issuing from the coils, the said product is passed at about 40° C., through a tower provided with fillers or the like in which a reduced pressure is maintained. The bulk of the water and some of the acetaldehyde escape, and the product is then run through a second tower at about 70° C., in which the remainder of the acetaldehyde is extracted in vacuo and can be returned directly to the reaction. The reaction product is aldol of sufficient purity to be used for many purposes, such for example as hydrogenation to butylene glycol.

What we claim is:—

1. A process for the production of aldol from acetaldehyde which comprises continuously passing a mixture comprising acetaldehyde and a condensing agent through a cooled reaction chamber.

2. A process for the production of aldol from acetaldehyde which comprises continuously passing a mixture comprising acetaldehyde and a condensing agent through a cooled reaction chamber, the temperature of the reaction mixture being gradually raised during the passage through the reaction chamber.

3. A process for the production of aldol from acetaldehyde which comprises continuously passing a mixture comprising acetaldehyde and a condensing agent through a cooled reaction chamber, the condensing agent employed being added at different places of the reaction chamber during the passage of the reaction mixture therethrough.

4. A process for the production of aldol from acetaldehyde which comprises continuously passing a mixture comprising acetaldehyde and a condensing agent through a cooled reaction chamber, the condensing agent employed being added at different places of the reaction chamber during the passage of the reaction mixture therethrough and the temperature of the reaction mixture being gradually raised during the passage through the reaction chamber by gradually reducing the intensity of the cooling.

5. A process for the production of aldol from acetaldehyde which comprises continuously passing a mixture comprising acetaldehyde and a condensing agent through a cooled reaction chamber, continuously separating crude aldol from the aqueous reaction mixture containing acetaldehyde and continuously removing water and remainders of acetaldehyde from the separated crude aldol.

6. A process for the production of aldol from acetaldehyde which comprises continuously passing a mixture comprising acetaldehyde and a condensing agent through a cooled reaction chamber, continuously rendering neutral the reaction mixture containing aldol, acetaldehyde and water, continuously separating crude aldol from the resulting aqueous mixture and continuously removing water and remainders of acetaldehyde from the separated crude aldol.

In testimony whereof we have hereunto set our hands.

MARTIN MUELLER-CUNRADI.
KURT PIEROH.